United States Patent
Igelman et al.

(10) Patent No.: US 8,595,342 B2
(45) Date of Patent: Nov. 26, 2013

(54) SYNCHRONIZED MEDIA PLAYBACK USING AUTONOMOUS CLIENTS OVER STANDARD INTERNET PROTOCOLS

(75) Inventors: Marvin Igelman, Thornhill (CA); Aleksandar Zivkovic, North York (CA)

(73) Assignee: Reazer Investments L.L.C., Dover, DE (US)

( * ) Notice: Subject to any disclaimer, the term of this patent is extended or adjusted under 35 U.S.C. 154(b) by 401 days.

(21) Appl. No.: 12/253,490

(22) Filed: Oct. 17, 2008

(65) Prior Publication Data

US 2009/0106357 A1    Apr. 23, 2009

Related U.S. Application Data

(60) Provisional application No. 60/999,319, filed on Oct. 17, 2007.

(51) Int. Cl.
*G06F 15/173* (2006.01)
*G06F 15/16* (2006.01)
*G06F 17/00* (2006.01)

(52) U.S. Cl.
USPC .............................. 709/223; 709/231; 715/201

(58) Field of Classification Search
USPC ........... 709/204, 223, 231; 370/465; 715/201; 375/E7.01
See application file for complete search history.

(56) References Cited

U.S. PATENT DOCUMENTS

| 6,715,126 B1 * | 3/2004 | Chang et al. .................. 715/201 |
| 2004/0225728 A1 * | 11/2004 | Huggins et al. ............... 709/223 |
| 2005/0286417 A1 * | 12/2005 | An et al. ........................ 370/229 |
| 2006/0161621 A1 * | 7/2006 | Rosenberg ..................... 709/204 |
| 2008/0059580 A1 * | 3/2008 | Kalinowski et al. .......... 709/204 |
| 2008/0229215 A1 * | 9/2008 | Baron et al. ................... 715/751 |
| 2009/0210904 A1 | 8/2009 | Baron et al. ..................... 725/39 |
| 2010/0083324 A1 | 4/2010 | Smith et al. .................... 725/109 |
| 2010/0122304 A1 | 5/2010 | Scott, III .......................... 725/89 |

OTHER PUBLICATIONS

International Searching Authority, Canadian Intellectual Property Office, International Search Report/Written Opinion—Application No. PCT/IB2008/003852, completed Aug. 31, 2009, mailed Sep. 1, 2009, 11 pages.

Broadcastle Corporation, The Networked Home, Broadcastle, Sep. 2002, pp. 1-5.

Broadcastle Corporation, Broadcastle SoundSync™ Whole House Audio System, Broadcastle, undated, 2 pages.

\* cited by examiner

*Primary Examiner* — Peling Shaw
(74) *Attorney, Agent, or Firm* — Woodcock Washburn LLP

(57) ABSTRACT

A method of achieving synchronous playback of media content over the internet, such as digital video and audio, when the media content is stored on a host that does not have synchronous broadcasting software installed. Users select media sources that are accessible from one or more content servers and create a broadcast playlist. A database maintains a virtual-time record of the broadcast. A server receives a client request for the broadcast, retrieves the virtual-time record from the database, and delivers it to the client. The client then accesses the remotely-stored media source and plays it in a media player, synchronously with all other clients receiving the broadcast.

27 Claims, 6 Drawing Sheets

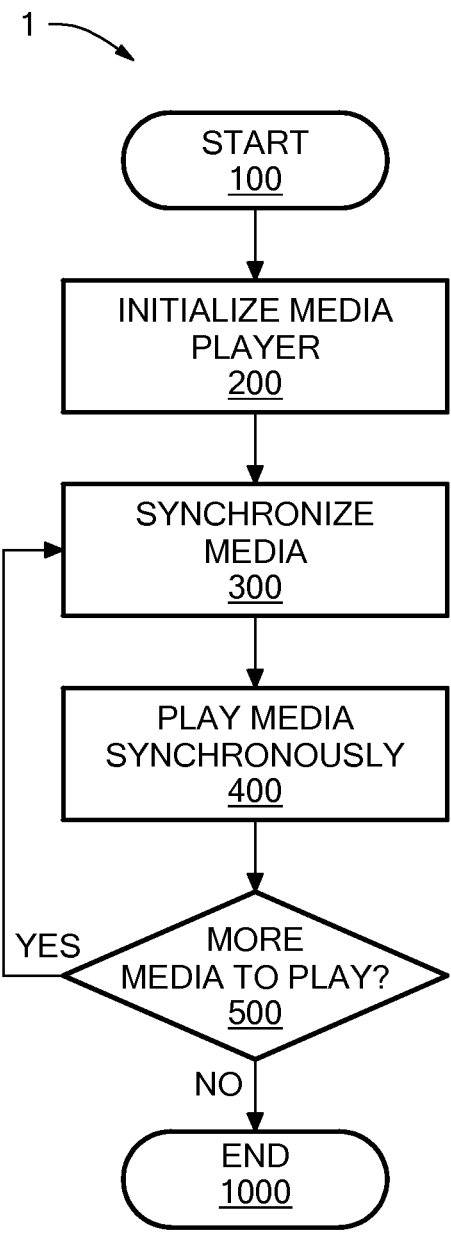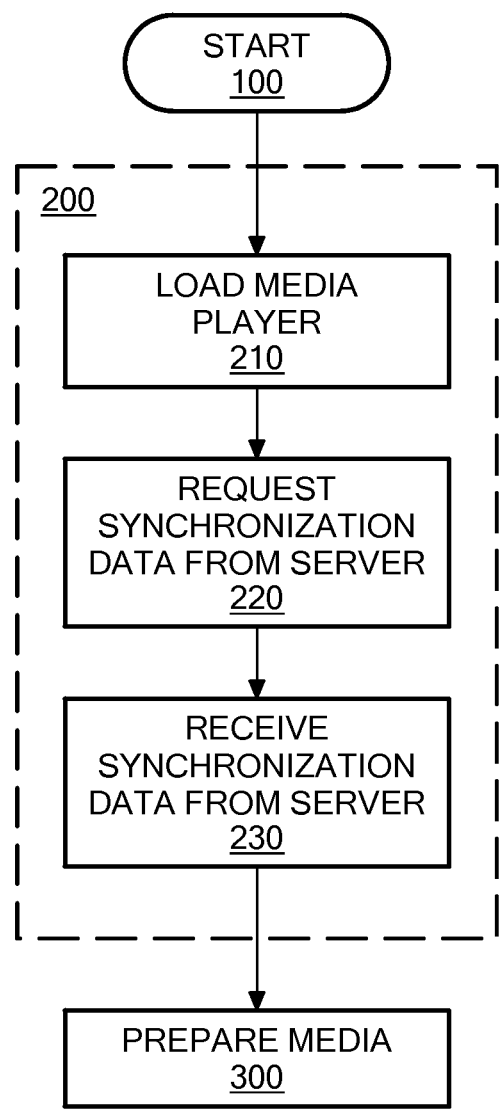
*FIG. 1*  *FIG. 2*

SYNCHRONIZED MEDIA PLAYBACK USING AUTONOMOUS CLIENTS OVER STANDARD INTERNET PROTOCOLS

The present application claims priority from U.S. Provisional Application No. 60/999,319, filed Oct. 17, 2007, the full disclosure of which is hereby incorporated by reference herein.

TECHNICAL FIELD

The present invention relates generally to media delivery systems, and more particularly to the synchronized distribution to clients of remotely stored media content such as multimedia files over the internet.

BACKGROUND ART

It is known in the prior art for users to share user-generated content (UGC) over the internet. It can be especially challenging to distribute files containing video content over the internet, such as, for example, multimedia files that contain both video and audio content. For convenience, files containing video content may be referred to hereinafter as "videos."

Typically, if a person wants to share a video with another, he or she might send an email or instant message containing a link to a web page that contains the video (be it embedded or source web page). Such videos are often hosted by user-generated video on-demand services such as YouTube, DailyMotion, and MySpaceTV and are typically encoded according to the Adobe Flash Video (FLV) standards, in part because Adobe FLV files can be served from a server without the need to employ complex broadcasting software. Generally speaking, as long as the FLV is accessible using a stateless protocol such as HTTP or RMTP, it can be consumed by an Adobe Flash client. When the client accesses the FLV, it starts to download the file and starts playing immediately from the beginning of the file.

Users of user-generated content distribution sites such as those mentioned above typically watch videos independently of one another. The clients will start playing the video at different times, and the clients may pause playback or search through the video to specific locations. It may be possible for multiple clients to watch a video at the same time in the on-demand world (e.g., by getting on the phone and agreeing to press the PLAY button on the embedded player at the same time), but such coordination is cumbersome and is impractical when there are more than two parties that would like to watch the video in synchronized fashion and share their opinion. Thus, in this on-demand world, there generally is no shared viewing experience.

The experience of watching videos at the same time as other viewers, especially when chat programs make it possible to communicate with the other viewers in real time and discuss what is playing, can be a source of both entertainment and enhanced communication. Certain websites that host user-generated content have offered some capability for creating a synchronous viewing experience for videos that are hosted on that site. Such synchronous viewing typically involves installing protocols in the host that provide synchronization, for example, live streaming protocols (e.g., Microsoft Media Server broadcasting). Such protocols generally are more complex and have additional resource requirements compared to on-demand protocols of the types discussed above.

SUMMARY OF THE INVENTION

In accordance with an embodiment of the present invention, the method of synchronously delivering media content includes providing autonomous media players to a plurality of clients. A server provides synchronization data to the autonomous media players. The media players then access media content that is not stored on the server. The media players then deliver the content synchronously to their respective clients.

In accordance with an embodiment of the present invention, the autonomous media players are delivered to the clients over the internet. In an embodiment of the present invention, this is accomplished by embedding the media player in a webpage using XML.

In accordance with an embodiment of the present invention, the client sends requests to the server and the server sends replies to the client. The client and the server send the requests and replies according to a stateless protocol, such as HTTP or RTMP. Session information about the client is not stored on the server.

In accordance with an embodiment of the present invention, the synchronization data sent from the server to the client is stored in a database. In response to a client request for synchronization data, the server retrieves the synchronization data from the database and sends it to the client.

In accordance with an embodiment of the present invention, the synchronization data stored in the database is generated from user input. A user provides information about a media source. The user-provided information is used to generate synchronization data. The synchronization data is then stored in the database.

In accordance with an embodiment of the present invention, clients that are receiving a synchronous media broadcast send skip votes to the server. If a predetermined percentage of the clients send skip votes, the currently playing media file is immediately stopped and a next media file is played.

The foregoing features of the invention will be more readily understood by reference to the following detailed description, taken with reference to the accompanying drawings.

BRIEF DESCRIPTION OF THE DRAWINGS

FIG. 1 is a flow chart of actions performed by a client interacting with a synchronous multimedia delivery network in accordance with an exemplary embodiment of the present invention.

FIG. 2 is a flow chart of a media player initialization process in accordance with an exemplary embodiment of the present invention.

DETAILED DESCRIPTION OF SPECIFIC EMBODIMENTS

Definitions. As used in this description and the accompanying claims, the following terms shall have the meanings indicated, unless the context otherwise requires:

A "stateless protocol" as used herein is a protocol for communicating over the internet between a client and a server, without storing session information on the server. The actions a server takes in response to a message from a client are based solely on the content of the current message, and not on any previous message. Examples of stateless protocols include HTTP and RMTP.

An "autonomous media player" is a media player capable of running predominantly independently of a server, where media content played by the autonomous media player is not stored on or processed by the server.

The "internet" is generally used to mean "the Internet" as it is almost universally known, although the term may additionally or alternatively refer to other types of public and/or private networks over which various embodiments of the present invention may operate, such as, for example, local area networks, metropolitan area networks, wide area networks, cellular networks, etc.

Exemplary embodiments of the present invention allow videos and other types of media files from different hosts to be viewed by multiple clients in a manner similar to a television broadcast, continuously and synchronously, in a single viewing session without running broadcast software on the hosts. Specifically, a synchronization server maintains a "playlist" of one or more videos residing on various content servers and provides synchronization information to a number of clients that want to view the playlist. Rather than obtaining the videos from the synchronization server, however, each client obtains the videos directly from the content servers that host the videos and maintains synchronization with other clients based on the synchronization information obtained from the synchronization server so that the clients play the same content at virtually the same time. The synchronization server keeps track of such things as the current video and the current location within the current video, and the clients contact the synchronization server to obtain such information in order to continue synchronous operation. The synchronization server checks for and responds to various exception conditions, such as, for example, videos that are no longer available from the content servers and changes made to the playlist dynamically. The synchronization server may also provide for unilateral or collaborative control of the broadcast, for example, by allowing a particular client to control such things as stopping, starting, rewinding, fast-forwarding, and skipping a video or allowing clients to vote on such control, and the synchronization server updates the synchronization information accordingly.

Figure 7:
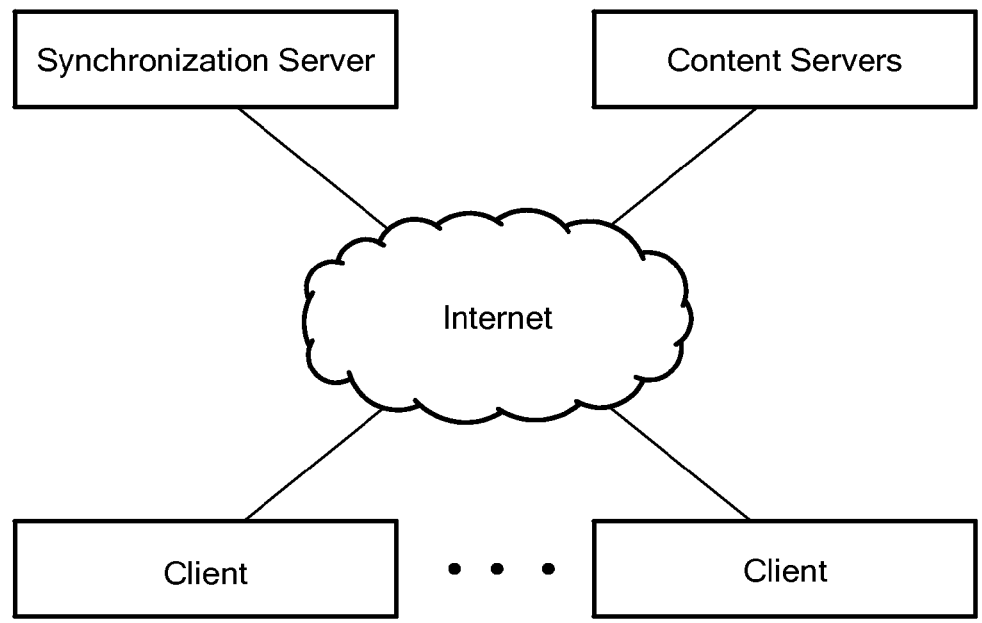
FIG. 7 is a schematic diagram showing a synchronous media delivery system in accordance with an exemplary embodiment of the present invention.

FIG. 7 is a schematic diagram showing a synchronous media delivery system in accordance with an exemplary embodiment of the present invention. Among other things, the synchronous media delivery system includes a synchronization server, various content servers, and various clients, all coupled to a communication network such as the internet. The synchronization server includes three main components relating to the synchronous media delivery system, namely a set publisher, a synchronization service, and a media player. The set publisher is used to create and publish a set of one or more videos for broadcast to a viewer community. The synchronization service manages the broadcast and provides synchronization information to the clients. The media player is a browser plugin that is typically created in Flash and is run on client devices in order to interface with the synchronization service and the content servers. These components are discussed in greater detail below.

Figure 8A:
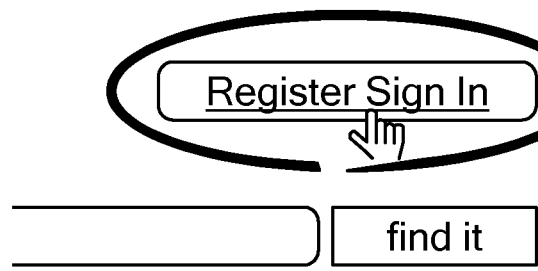
FIGS. 8A-8D show representations of a user interface for creating and publishing sets of videos for broadcasting, in accordance with an exemplary embodiment of the present invention.
Figure 8B:
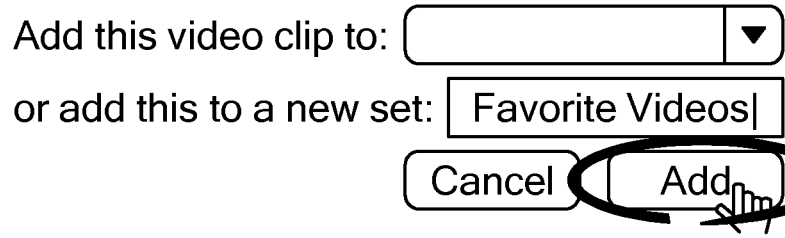
Figure 8C:
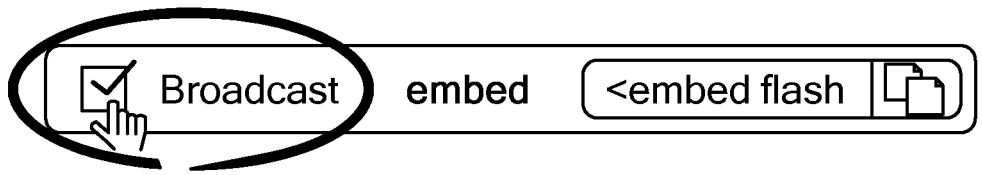
Figure 8D:
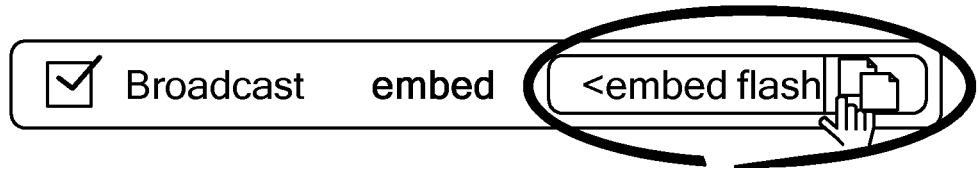

Clients access the set publisher component of the synchronization server to create and publish sets of videos (which may be referred to herein as a "playlist" or "broadcast") from various content servers for broadcast to a viewing community. Specifically, the set publisher includes a user interface (typically web-based) that allows a client to register with or sign in to the server, as shown in FIG. 8A; search for videos and add videos to a new or existing set, as shown in FIG. 8B; initiate a synchronized viewing event and record the synchronized viewing event in a database, by clicking the "broadcast" checkbox as shown in FIG. 8C; and obtain embed code that contains a reference to the synchronization service as well as parameters that correspond to the set, by clicking the "copy" icon as shown in FIG. 8D in order to copy the embed code to the clipboard. It should be noted that a set may be public (i.e., accessible by anyone) or private (i.e., accessible only by a selected group of clients).

The following is a sample embed code for an exemplary embodiment of the present invention: <embed allowscriptaccess="never" allownetworking="internal" flashvars="setId=2996" src="http://www.trooker.com player/loungePlayer.swf" quality="high" wmode="transparent" width="448" height="417" align="middle" allowfullscreen="false" type="application/x-shockwave-flash" pluginspage="http://www.macromedia.com/go/getflashplayer"></embed>

In this sample of embed code, the src field includes the URL of the embedded media player (i.e., http://www.trooker.com player/loungePlayer.swf) and the flashvars field includes a set identifier associated with the broadcast (i.e., setId=2996). Other information in the embed code defines such things as display position and size.

The embed code can be populated (e.g., pasted from the clipboard) into virtually any web page that supports custom embedded content. Clients that access those web pages are able to view the broadcast set in a manner that is synchronized across the clients. In essence, videos in the set will be viewed continuously, like a video broadcast, by the viewer community even though it may consist of many short form videos, often from different content servers.

Thus, the media player is embedded on various web pages with reference to a set that is in broadcast mode. When a client accesses such a web page, the media player is initialized, and the media player then contacts the synchronization service in the synchronization server to obtain synchronization information for the broadcast. In an exemplary embodiment, the synchronization information includes such things as the currently playing video, the current location within the currently playing video (referred to herein as the "playhead" and discussed in greater detail below), the next video in the set, a time when the media player should check back with the synchronization service (e.g., at the end of the current video), and information regarding any discrepancy between local media player playhead time and synchronization service playhead time. The media player proceeds to start the download of the currently playing video directly from the appropriate content server, and once the currently playing video playhead position is reached, it starts the video playback so as to enable a synchronized viewing experience. Thus, the media player operates in a substantially autonomous manner, performing minimal communication with the synchronization service and playing a video directly from the content server until it is time to check back with the synchronization service, without requiring the synchronization service to store and serve the content to the media player. Individual clients may have different bandwidth throughputs, but the clients can remain synchronized as long as they are able to download the video faster than the video is playing. Even in cases where the download speed of a client is slower than the video is playing or a client is otherwise unable to obtain content, which may result in some of the video being missed, the broadcast mechanism provides the client with opportunities to catch up with the broadcast during the same video or during a later video.

The synchronization service is responsible for tracking such things as the server based time, resolution of the location of the video, the currently playing video, and playhead location within the video, and the next video. The synchronization service responds to requests from the client with messages that indicate the above information, as well as when the client needs to check back with the service. In an exemplary embodiment, the synchronization service operates in stateless manner, meaning there is no requirement of storing any session information. Instead, each request received from a client includes all of the information needed for the synchronization service to provide the client with appropriate synchronization information for the relevant broadcast. Because this exemplary broadcast mechanism is stateless, it may be distributed on multiple servers and may be accessed from multiple clients over a standard stateless protocol such as HTTP or RMTP. Also, because this exemplary broadcast mechanism is based on standard stateless protocols (e.g., HTTP over standard port 80), it generally can be used within standard internet sites that support such protocols.

A process 1 by which a client plays media content synchronously with other remote clients according to an embodiment of the present invention is now described with reference to FIG. 1. To begin 100, the client initializes 200 an autonomous media player. The media player then performs a synchronization process 300 in preparation for playing media in a synchronous broadcast. Once the synchronization process 300 is completed, the media player plays the media content synchronously 400 with the media players associated with the other clients. All clients viewing the broadcast view the media content substantially at the same time. For as long as there is more media to be played 500 in the broadcast, the media player continues to retrieve 300 synchronization data for the next media file and to play the media file synchronously 400. If at any time there are no more media files left to broadcast, the synchronous broadcast ends 1000. The client may also choose at any time to exit the broadcast, in which case the broadcast will continue for the remaining clients, so long as at least one synchronous client remains.

A process 200 by which a client initializes an autonomous media player according to an embodiment of the present invention is now described with reference to FIG. 2. An autonomous media player is received 210 over the internet from a server. In one embodiment, the autonomous media player is embedded in a webpage using XML. In another embodiment, the autonomous media player may be downloaded from the server onto the client as executable code that is then stored on the client until the client is ready to initiate a connection to a synchronous media broadcast, at which time the code is executed.

Once the autonomous media player is loaded 210, the media player sends 220 a request to the server for the synchronization data that will allow the media player to connect to the current broadcast. The server responds 230 by sending the requested data to the media player. This data preferably includes a currently playing media file, a media playhead relating to the currently playing media file, and a next media file to be played, as described more fully below. The currently playing media file may be indicated by sending an internet location where the media file can be accessed via a HTTP, RMTP, or another stateless protocol. The server providing the synchronization data generally does not store or serve any media content (although it could store and serve some or all of the media content for a particular broadcast), and no multipoint broadcasting software is used on the source of the media content to create the broadcast.

The media playhead is a virtual playhead indicating the current location in the media file that is being broadcast. In effect, the playhead does not exist unless and until there is at least one synchronized client subscribed to the broadcast. The primary purpose of this virtual playhead is to provide all synchronization clients with information such as currently playing video, current offset into the currently playing video, and upcoming video (for double buffering). When the first synchronization client requests information, the server playhead is initiated and it will exist until there are no longer any clients receiving the current broadcast. In an exemplary embodiment, when any of the clients add new videos to the set, these new videos take precedence over the old ones, and server playhead is adjusted accordingly. Also, when any of the videos that were selected by users are no longer available, it is the responsibility of the server playhead to adjust the order of the videos accordingly.

In exemplary embodiments, the server playhead may be influenced in other ways. For example, the system may include a voting function that allows clients to vote to skip a particular video or take other action. For example, when some percentage of the clients (e.g., more than 50%) votes to skip a video, the server playhead receives this information from the synchronization control service and adjusts the server playhead by skipping to the next video. This is announced to the clients and they all therefore change to the next video as determined by the server playhead.

The media player can use this location to begin playback at a location that is current in the broadcast, meaning that the media player will be playing the media file synchronously with the other media players connected to the synchronous broadcast. The next media file to be played is provided so that the media player can begin to buffer the next media file before the end of the currently playing media file. This allows for a smooth transition from the end of one media file to the beginning of the next, because there is no delay between when the first file ends and when the client is able to begin playback of the second file.

In addition to the information described above, the media player also determines the end of the media file. This information may be sent in the response from the server, or it may be provided by the media source from which the media player downloads the media file. Because the media player knows when the current media file is going to end, it can begin buffering the next media file at some time before the end of the current media file. Because in some embodiments the next media file may change while the current media file is playing, the media player typically does not begin buffering the next media file until a predetermined time before the end of the currently playing media file (e.g., X seconds prior to the end of the currently playing media file), although the media player could begin buffering a media file earlier and discard the buffered media file if it is not needed. In an exemplary embodiment, after the predetermined time, the next media file is locked and cannot be changed, so the media player knows it is the correct file to buffer. In one embodiment of the present invention, the predetermined time is 10 seconds. In exemplary embodiments, the request from the media player for synchronization data and the response from the server are typically sent using a stateless protocol such as HTTP or RMTP, and no session information relating to the client or the media player is stored by the server.

Figure 3:
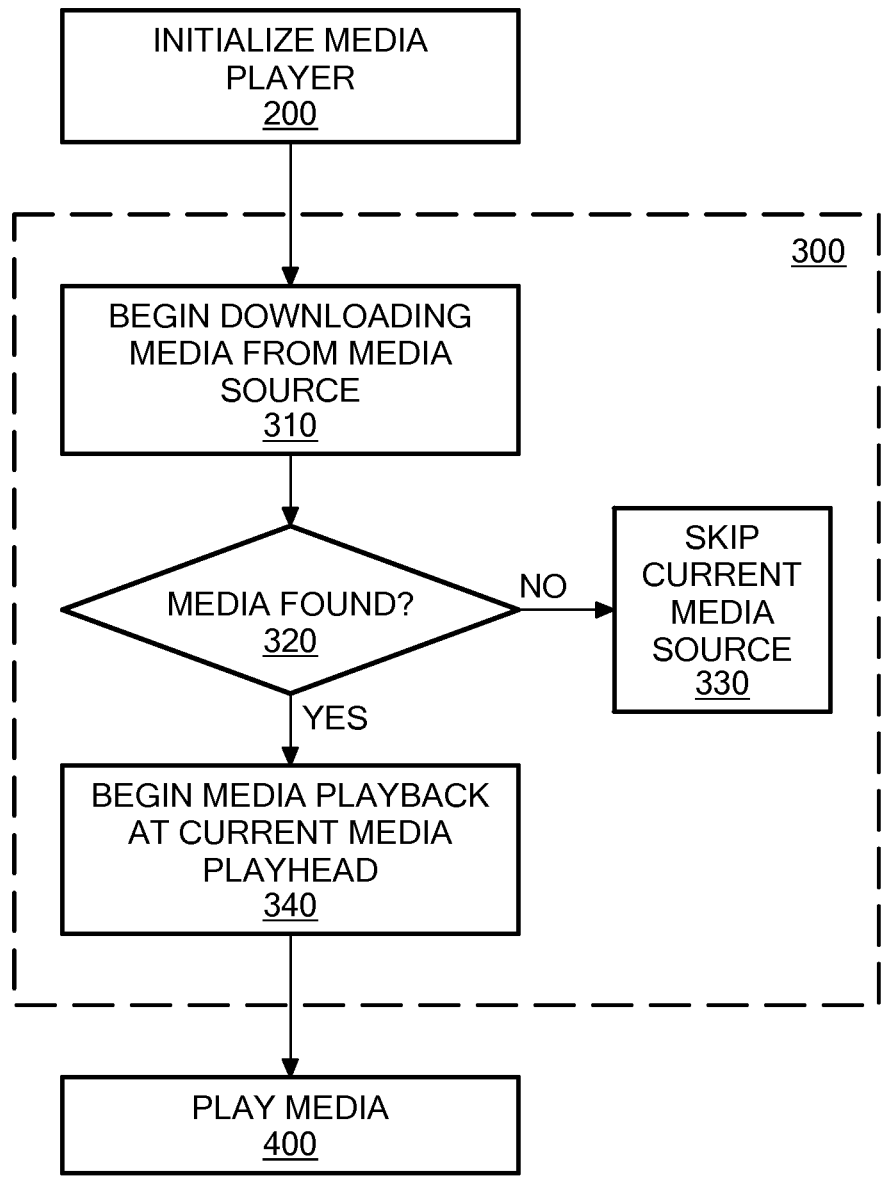
FIG. 3 is a flow chart of a media synchronization process in accordance with an exemplary embodiment of the present invention.

A process 300 by which a client synchronously plays media content according to an embodiment of the present invention is now described with reference to FIG. 3. The media player connects over a stateless protocol such as HTTP or RMTP to an independent media source indicated by the synchronization data received from the server 230 and begins to download 310 the media file. If the media file cannot be downloaded 320, the current media file is skipped 330. While the file is downloaded, the media player maintains a virtual media playhead based on the synchronization data received from the server 230. Thus at all times the media player knows the position in the media content of the synchronized broadcast. When a position is reached in the download allowing the autonomous media player to play the media starting at the current virtual media playhead, the autonomous media player begins to play the media 340 from that point, and thus plays the media content to the client synchronously with the other clients.

Figure 4:
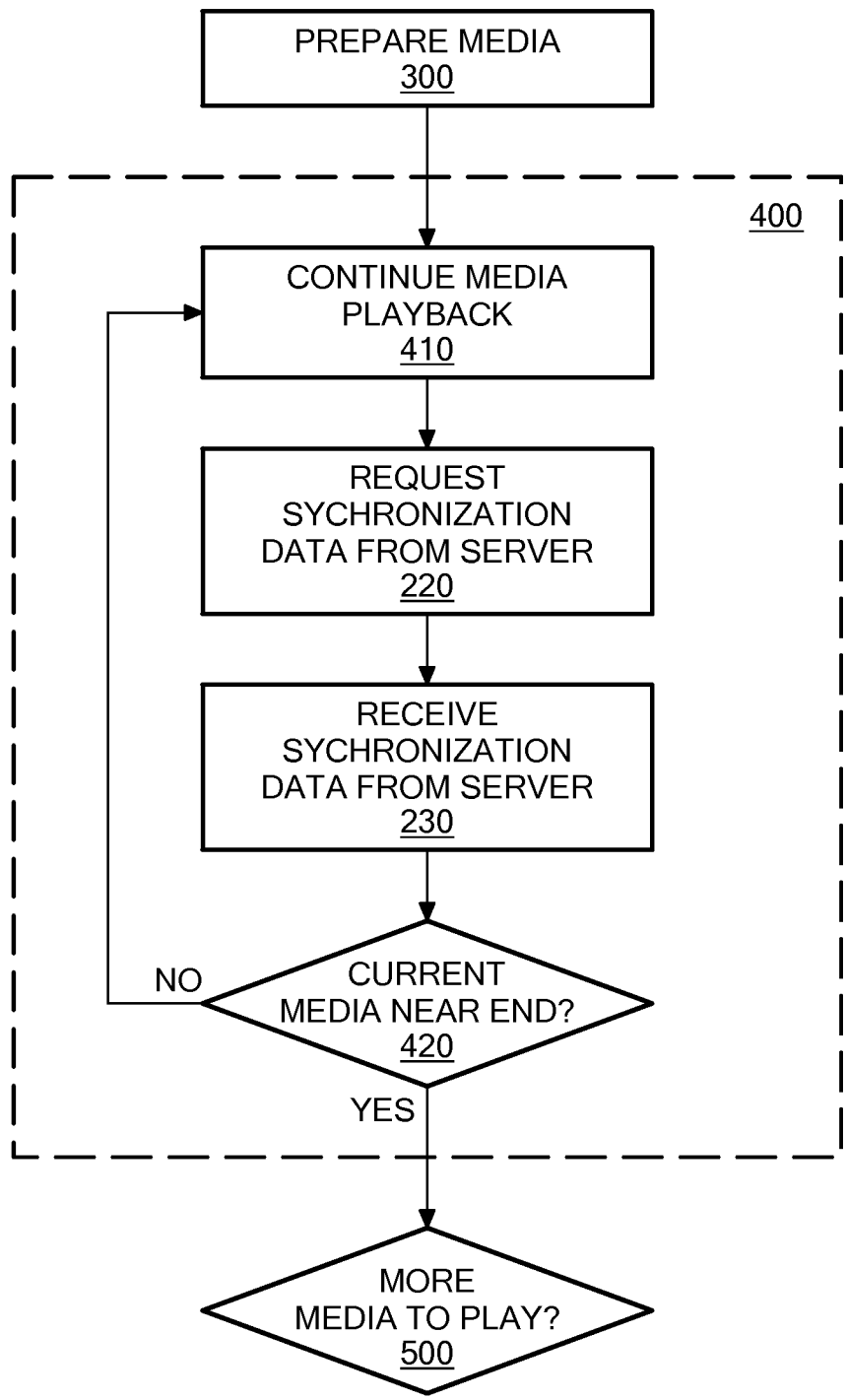
FIG. 4 is a flow chart of a synchronous media playback process in accordance with an exemplary embodiment of the present invention.

A process 400 by which a client plays media content according to an embodiment of the present invention is now described with reference to FIG. 4. Once the media file has been sufficiently buffered 310 to begin playback 340, the media file is streamed 410 from the media source. While the media file is streaming, the media player continues to send periodic synchronization requests 220 to the server, e.g., at times specified by the server, to which the server replies 230 by sending synchronization data. The synchronization data is used to verify that the media player remains synchronized with the virtual media playhead. A small tolerance generally will be allowed so that playback does not become jittery due to frequent changes in playback due to resynchronization of the media player. For example, if the client is viewing the media file "out of sync" with the virtual media playhead provided by the server, it will continue to play the media file without adjustment so long as the discrepancy between the actual playback position and the virtual media playhead does not exceed a pretermined tolerance. In one embodiment of the present invention, the tolerance is one second. In another embodiment, the tolerance is two seconds. It is preferable that the tolerance not be too large so that playback remains substantially synchronous at all times. As described above, when the end of a media file is approached 420, the next media file is locked, so that the media player may begin to buffer the next media file. Until the media file is locked because the end of the media file is approaching 420, streaming playback and resynchronization continue as described above.

Figure 5:
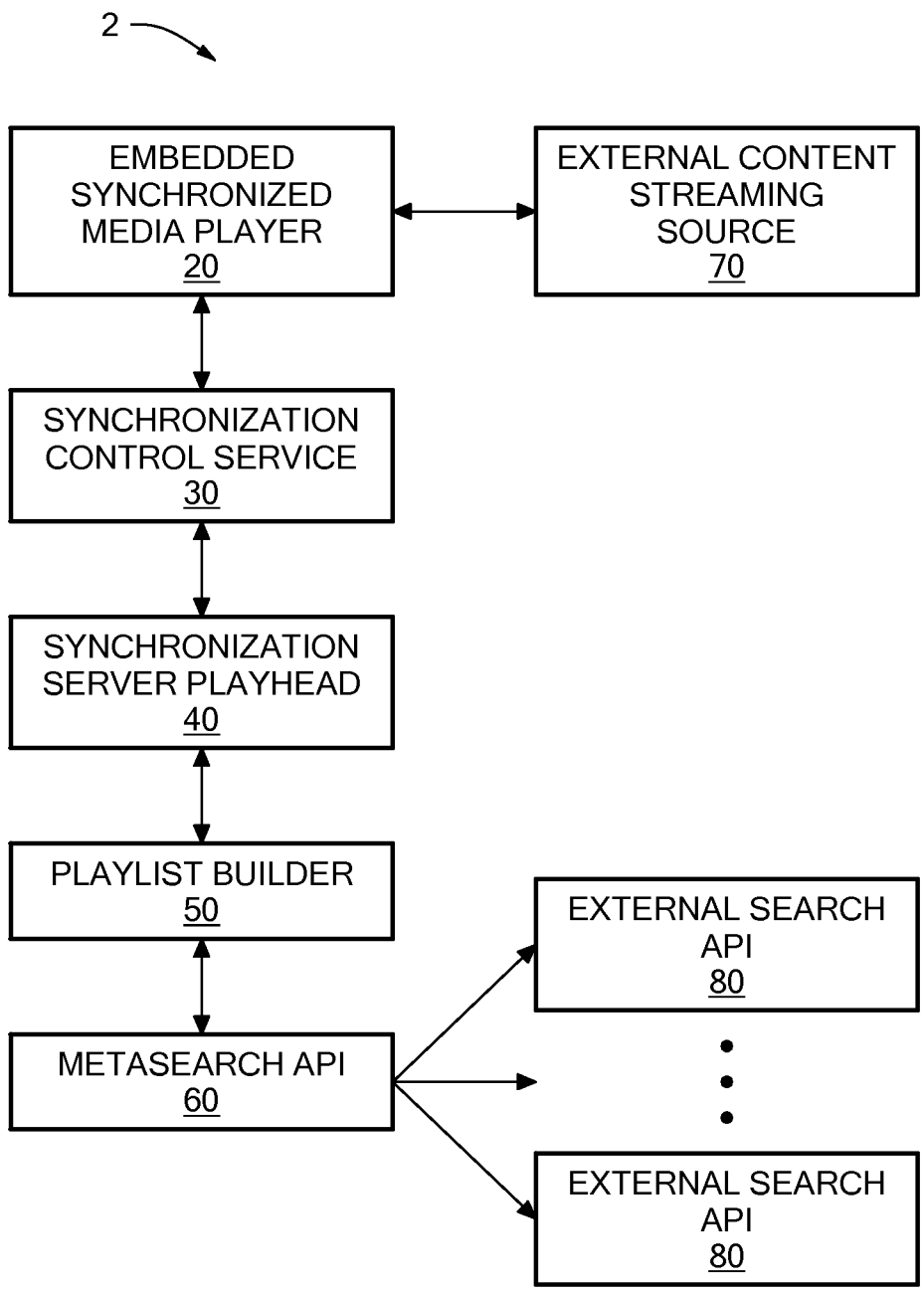
FIG. 5 is a schematic block diagram showing relevant components of a synchronous media delivery system in accordance with an exemplary embodiment of the present invention.

A synchronous media delivery system 2 according to an embodiment of the present invention is now described with reference to FIGS. 5-6. An embedded synchronized media player 20 is associated with a client. The embedded synchronized media player communicates via the internet with a synchronization control service 30 in a synchronization server using a stateless protocol. In this exemplary embodiment, no session information needs to be stored by the synchronization control service 30. Rather, the synchronization control service 30 responds to requests from the media players based on the information in each current request and not based on any prior request. The synchronization control service 30 is capable of communicating with a plurality of embedded synchronized media players 20, associated with a plurality of clients. The embedded synchronized media player 20 sends synchronization requests to the synchronization control service 30. The synchronization control service 30 accesses a synchronization server playhead 40 and retrieves synchronization data. According to an embodiment of the present invention, the synchronization server playhead 40 is implemented using a database. The database may be independent of the synchronization control service 30. In an embodiment where the database is independent of the synchronization control service 30, the synchronization control service 30 may be distributed across a plurality of servers. Among other things, this arrangement can provide performance enhancements to the overall system 2, such as increased processing power and load balancing. The synchronization control service 30 then sends the synchronization data to the embedded synchronized media player 20, for example, using web service REST calls. The synchronization control service 30 also receives feedback from clients (e.g., votes) and communicates the feedback to the playhead 40.

The embedded synchronized media player 20 downloads a media file from an external content streaming source 70. Typically, content streaming sources are UGC sites and their associated CDNs (Content Delivery Networks) that provide public access via their respective search APIs 80 to their media content served over the internet through stateless protocols such as HTTP or RMTP. The embedded synchronized media player 20 synchronizes the media file according to the synchronization data it received from the synchronization control service 30 and then continues to play the streaming media file. If the external content streaming source 70 cannot be reached, the embedded synchronized media player 20 sends an auto-skip message to the synchronization control service 30, indicating that the media file should be skipped in the current broadcast. As discussed above, in one embodiment of the present invention, clients may vote to take certain actions, such as, for example, to skip the currently playing media file. If a client votes to skip the currently playing media file, the embedded synchronized media player 20 sends a vote-skip message to the synchronization control service 30. If a predetermined percentage of clients viewing a synchronous media broadcast vote to skip the currently playing media file, the next media file queued up to be broadcasted starts playing immediately. The synchronization control service 30 receives any such messages and updates the synchronization data for the broadcast in a synchronization server playhead 40, described below.

The synchronization server playhead 40 maintains synchronization data for synchronous media broadcasts. The synchronization data is first generated by a playlist builder 50, which sends the synchronization data to the synchronization server playhead 40. The synchronization server playhead 40 then maintains and updates the synchronization data as necessary. According to an exemplary embodiment of the present invention, the playlist builder 50 can provide new synchronization data to the synchronization server playhead 40 while a broadcast is in progress, thereby changing the queue of pending media content, although the playlist builder 50 is not permitted to change the currently playing media file in an active synchronous broadcast. According to an exemplary embodiment of the present invention, the playlist builder 50 builds playlists according to user input. A user selects media content to be played, and the playlist builder 50 sends the appropriate synchronization data to the synchronization server playhead 40.

The playlist builder 50 sends search queries to a metasearch API 60. The metasearch API 60 then uses the search queries to generate and send search queries to a plurality of external search APIs 80, such as the YouTube API or the DailyMotion API. These APIs may provide advanced search capabilities, for example, using web protocols such as SOAP or REST, or may be simple search interfaces, for example, RSS feeds that provide query results. The external search APIs 80 receive the search queries and proceed to search their respective media content sites for the most relevant content. The external search APIs 80 return the results of the searches to the metasearch API 60, specifically in the form of metadata such as title, description, tags, content location, content duration, etc. In an embodiment of the present invention, a user inputs search terms to the metasearch API 60, which evaluates the search results from multiple external sites to provide a list of results sorted by relevance and also ensures that all fields used for synchronization (e.g., title, content duration, and publicly accessible FLV path) are available. The content duration is used to calculate the current video time offset information that is sent to the clients. It should be noted that a second roundtrip to the video source site is often needed to obtain the actual live FLV path. It also should be noted that public FLV paths are often time sensitive, so in an exemplary embodiment, the actual path resolution for such FLVs may be delayed until the video is requested from the synchronization service and is the responsibility of the synchronization control service. Once the search results are ready, the user then selects media content from the results of the searches, and information about the selected media content is sent to the playlist builder 50, which provides the appropriate synchronization data to the synchronization server playhead 40.

Although various exemplary embodiments are described above with reference to distribution of videos, it should be noted that the present invention is not necessarily limited to videos or to media files containing video content. Rather, the synchronization mechanisms described above may be applied to other types of media files generally, such as, for example, files containing any or all of video, audio, text, pictures, slideshows, etc. and may be used to synchronize presentation of otherwise static information, such as, for example, to synchronize viewing of (e.g., scrolling through) text files, word processor documents, spreadsheets, "pdf" files, etc.

Also, while various exemplary embodiments are described above with reference to specific protocols, it should be noted that the present invention is not necessarily limited to those protocols. Other types of protocols and variations of the specified protocols may be suitable for certain embodiments.

Also, while various exemplary embodiments are described above with reference to stateless protocols in which the synchronization server is able to distribute synchronization information without maintaining state information for the clients or the media players, it should be noted that the synchronization server may maintain certain types of information such as, for example, information allowing the synchronization server to determine whether there are any clients still receiving the current broadcast, information allowing the synchronization server to prevent unauthorized clients from receiving the broadcast, information allowing the synchronization server to respond to voting and other user controls, etc.

Figure 6:
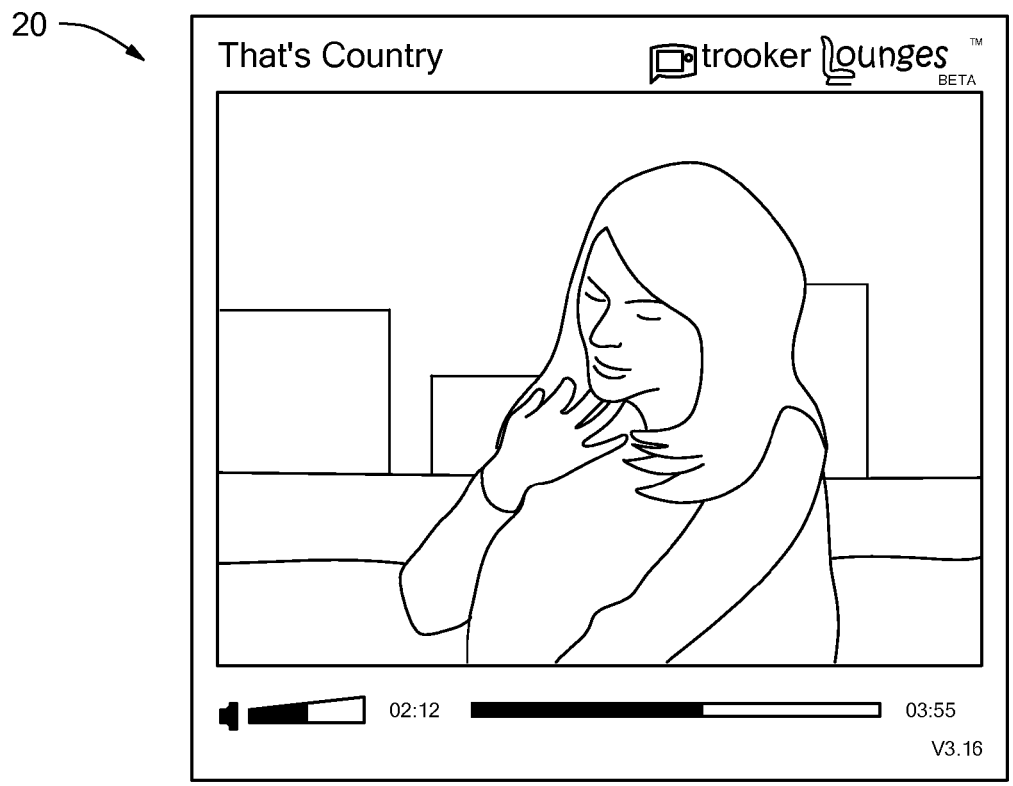
FIG. 6 is an example of a user interface display produced by an embedded media player in accordance with an exemplary embodiment of the present invention.

Also, while the exemplary user interface display shown in FIG. 6 includes no real actionable controls other than the volume control (the scrub control is view-only in this embodiment such that it displays the current player playhead position and FLV download position), it should be noted that the user interface display screen may be provided with certain user interface controls such as, for example, controls to allow for voting and/or controls to allow for user control of the broadcast.

In various embodiments, the synchronization information distributed by the synchronization server may specify the current location within the currently playing media file in relative terms (e.g., offset from beginning of the media file) or in absolute terms (e.g., page number, paragraph number, slide number, etc.).

It should be noted that certain indications used in this specification, such as YouTube, DailyMotion, MySpaceTV, Adobe FLV, and Microsoft MediaServer may be trademarks or registered trademarks of their respective owners.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of arranging synchronous display of a media broadcast, the media broadcast comprising a sequence of a plurality of media files, the method comprising:
    publishing, by a synchronization server, a listing of a plurality of available media broadcasts, wherein the plurality of available media broadcasts can be selected for play at one or more client devices;
    maintaining, only for each of the plurality of available media broadcasts currently being played at at least one client device, a virtual playhead comprising an indication of a media file currently being played in the media broadcast and an indication of a point at which the media file is being played;
    receiving, at the synchronization server, a request from a first client device to play a particular media broadcast;
    determining, in response to receiving the request from the first client device, that at least a second client device is playing the particular media broadcast by determining that a virtual playhead for the particular media broadcast is being maintained; and
    sending, from the synchronization server to the first client device, synchronization information comprising a location on one or more content servers of the media file indicated by the virtual playhead for the particular media broadcast and a point indicated by the virtual playhead for the particular media broadcast at which the media file is being played.

2. The method of claim 1, wherein the one or more content servers are remote from the synchronization server.

3. The method of claim 1, wherein the first client device comprises a media player which is configured to access the media file on the one or more content servers and to play the media file starting at a point within the media file based on the synchronization information.

4. The method of claim 1, wherein the synchronization information further comprises a location on the one or more content servers of a next media file to be played.

5. The method of claim 4, wherein the first client device is configured to buffer the next media file while the media file is being played at the first client device.

6. The method of claim 1, wherein the location of the media file is an internet location where the media file can be accessed.

7. The method of claim 1, further comprising:
    determining that the second client device has stopped playing the media broadcast and that the first client device is displaying the media broadcast;
    continuing maintaining the virtual playhead while the media broadcast is being played by at least the first client device;
    receiving, at the synchronization server, a request from a third client device to play the media broadcast;
    determining, in response to receiving the request from the third client device, that the virtual playhead is being maintained; and
    sending the synchronization information from the synchronization server to the third client device,
    wherein the third client device comprises a media player which is configured to access the media file on the one or more content servers and to play the media file starting at a point within the media file based on the synchronization information.

8. The method of claim 1, wherein the determining comprises accessing a database which comprises the virtual playhead.

9. The method of claim 1, further comprising:
    determining that the media broadcast is not being played by any client device; and
    stopping maintenance of the virtual playhead in response to determining that the media broadcast is not being played by any client devices device.

10. The method of claim 1, further comprising:
    accepting, by the synchronization server, control commands from only one of the first and second client devices, the control commands relating to control of the playing of the media broadcast at each of the the first and second client devices.

11. The method of claim 1, further comprising:
    receiving, at the synchronization server, votes from one or more client devices; and
    controlling the playing of the media broadcast at each of the first and second client devices based on the received votes.

12. A synchronization system for arranging synchronous display of a media broadcast, the media broadcast comprising a sequence of a plurality of media files, the synchronization system comprising:
    a communication mechanism configured to communicate with a plurality of client devices; and
    a computer readable medium comprising instructions executable by the synchronization system, the instructions comprising:
        instructions to publish a listing of a plurality of available media broadcasts, wherein the plurality of available media broadcasts can be selected for play at one or more of the plurality of client devices;
        instructions to maintain, only for each of the plurality of available media broadcasts currently being played at at least one of the plurality of client devices, a virtual playhead comprising an indication of a media file currently being played in the media broadcast and an indication of a point at which the one of the plurality of media files is being played;
        instructions to receive, via the communication mechanism, a request from the a first client device to play the media broadcast;
        instructions to determine that at least one of the plurality of client devices is playing the media broadcast by determining that the virtual playhead is being maintained; and
        instructions to send, to the first client device via the communication mechanism, synchronization information comprising a location on one or more content servers of the media file indicated by the virtual playhead for the particular media broadcast and a point indicated by the virtual playhead for the particular media broadcast at which the media file is being played.

13. The synchronization system of claim 12, wherein the one or more content servers are remote from the synchronization server.

14. The synchronization system of claim 12, wherein the first client device comprises a media player which is configured to access the media file on the one or more content servers and to play the media file starting at a point within the media file based on the synchronization information.

15. The synchronization system of claim 12, wherein the synchronization information further comprises a location on the one or more content servers of a next media file to be played.

16. The synchronization system of claim 12, further comprising:
a database comprising the virtual playhead.

17. The synchronization system of claim 12, wherein the instructions further comprise:
instructions to stop maintenance of the virtual playhead in response to a determination that the media broadcast is not being played by any of the plurality of client devices.

18. A computer readable medium comprising instructions to arrange synchronous display of a media broadcast, the media broadcast comprising a sequence of a plurality of media files, the instructions comprising:
instructions to publish a listing of a plurality of available media broadcasts, wherein the plurality of available media broadcasts can be selected for play at one or more client devices;
instructions to maintain, only for each of the plurality of available media broadcasts currently being played at at least one client device, a virtual playhead comprising an indication of a media file currently being played in the media broadcast and an indication of a point at which the media file is being played;
instructions to receive a request from a first client device to play a particular media broadcast;
instructions to determine, in response to receiving the request from the first client device, that at least a second client device is playing the particular media broadcast by determining that a virtual playhead for the particular media broadcast is being maintained; and
instructions to send, to the first client device, synchronization information comprising a location on one or more content servers of the media file indicated by the virtual playhead for the particular media broadcast and a point indicated by the virtual playhead for the particular media broadcast at which the media file is being played.

19. The computer readable medium of claim 18, wherein the instructions to receive the request from the first client device comprise instructions for a synchronization server to receive the request from the first client device, and wherein the one or more content servers are remote from the synchronization server.

20. The computer readable medium of claim 18, wherein the first client device comprises a media player which is configured to access the media file on the one or more content servers and to play the media file starting at a point within the media file based on the synchronization information.

21. The computer readable medium of claim 18, wherein the synchronization information further comprises a location on the one or more content servers of a next media file to be played.

22. The computer readable medium of claim 18, wherein the location of the first media file is an internet location where the media file can be accessed.

23. The computer readable medium of claim 18, wherein the instructions further comprise:
instructions to determine that the second client device has stopped playing the media broadcast and that the first client device is displaying the media broadcast;
instructions to continue maintaining the virtual playhead while the media broadcast is being played by at least the first client device;
instructions to receive, at a synchronization server, a request from a third client device to play the media broadcast;
instructions to determine, in response to receiving the request from the third client device, that the virtual playhead is being maintained; and
instructions to send, to the third client device, the synchronization information,
wherein the third client device comprises a media player which is configured to access the media file on the one or more content servers and to play the media file starting at a point within the media file based on the synchronization information.

24. The computer readable medium of claim 18, wherein the instructions to determine comprise:
instructions to access a database which comprises the virtual playhead.

25. The computer readable medium of claim 18, wherein the instructions further comprise:
instructions to determine that the media broadcast is not being played by any client device; and
instructions to stop maintenance of the virtual playhead in response to determining that the media broadcast is not being played by any client device.

26. The computer readable medium of claim 18, wherein the instructions further comprise:
instructions to accept control commands from only one of the first and second client devices, the control commands relating to control of the playing of the media broadcast at each of the the first and second client devices.

27. The computer readable medium of claim 18, wherein the instructions further comprise:
instructions to receive votes from one or more client devices; and
instructions to control the playing of the media broadcast at each of the first and second client devices based on the received votes.

* * * * *

UNITED STATES PATENT AND TRADEMARK OFFICE
CERTIFICATE OF CORRECTION

Page 1 of 2

PATENT NO. : 8,595,342 B2
APPLICATION NO. : 12/253490
DATED : November 26, 2013
INVENTOR(S) : Igelman et al.

It is certified that error appears in the above-identified patent and that said Letters Patent is hereby corrected as shown below:

In the Specifications

In Column 1, Line 33, delete "RMTP," and insert -- RTMP, --, therefor.

In Column 3, Line 13, delete "RMTP." and insert -- RTMP. --, therefor.

In Column 4, Lines 24-25, delete ""http://www.trooker.com player/loungePlayer.swf"" and insert -- "http://www.trooker.com/player/loungePlayer.swf" --, therefor.

In Column 4, Lines 31-32, delete "(i.e., http://www.trooker.com player/loungePlayer.swf)" and insert -- (i.e., http://www.trooker.com/player/loungePlayer.swf) --, therefor.

In Column 5, Line 26, delete "RMTP." and insert -- RTMP. --, therefor.

In Column 6, Line 3, delete "RMTP," and insert -- RTMP, --, therefor.

In Column 7, Line 2, delete "RMTP," and insert -- RTMP, --, therefor.

In Column 7, Line 8, delete "RMTP" and insert -- RTMP --, therefor.

In Column 7, Line 40, delete "pretermined" and insert -- predetermined --, therefor.

In Column 8, Line 22, delete "RMTP." and insert -- RTMP. --, therefor.

In Column 10, Line 6, delete "MediaServer" and insert -- Media Server --, therefor.

In the Claims

In Column 12, Line 14, in Claim 9, delete "client devices device." and insert -- client device. --, therefor.

Signed and Sealed this
Thirteenth Day of May, 2014

Michelle K. Lee
*Deputy Director of the United States Patent and Trademark Office*

In Column 12, Line 19, in Claim 10, delete "of the the" and insert -- of the --, therefor.

In Column 12, Line 48, in Claim 12, delete "from the a" and insert -- from a --, therefor.

In Column 14, Line 44, in Claim 26, delete "of the the" and insert -- of the --, therefor.